(12) United States Patent
Shibutani et al.

(10) Patent No.: US 8,396,210 B2
(45) Date of Patent: Mar. 12, 2013

(54) CRYPTOGRAPHIC PROCESSING APPARATUS AND CRYPTOGRAPHIC PROCESSING METHOD, AND COMPUTER PROGRAM

(75) Inventors: Kyoji Shibutani, Kanagawa (JP); Taizo Shirai, Kanagawa (JP); Toru Akishita, Tokyo (JP); Shiho Moriai, Kanagawa (JP)

(73) Assignee: Sony Corporation, Tokyo (JP)

( * ) Notice: Subject to any disclaimer, the term of this patent is extended or adjusted under 35 U.S.C. 154(b) by 305 days.

(21) Appl. No.: 12/439,250

(22) PCT Filed: Aug. 29, 2007

(86) PCT No.: PCT/JP2007/066731
§ 371 (c)(1),
(2), (4) Date: Oct. 22, 2009

(87) PCT Pub. No.: WO2008/026623
PCT Pub. Date: Mar. 6, 2008

(65) Prior Publication Data
US 2010/0091991 A1    Apr. 15, 2010

(30) Foreign Application Priority Data
Sep. 1, 2006    (JP) .................................. 2006-238226

(51) Int. Cl.
H04L 29/06    (2006.01)
(52) U.S. Cl. ........................................... 380/28; 380/29
(58) Field of Classification Search .................. 380/259, 380/37, 264, 277, 28, 30, 29; 713/169, 189; 708/252; 707/101
See application file for complete search history.

(56) References Cited

U.S. PATENT DOCUMENTS 5,003,597 A * 3/1991 Merkle ............................ 380/37
5,825,886 A * 10/1998 Adams et al. .................... 380/28
(Continued)

FOREIGN PATENT DOCUMENTS

EP    1788542 A1 *  5/2007
JP    2005-107078      4/2005
(Continued)

OTHER PUBLICATIONS

T. Yamaguchi, Dynamic reconfiguration for the common key encryption using FPGA, Mar. 26, 2003.*

(Continued)

Primary Examiner — Jung Kim
Assistant Examiner — Shan Elahi
(74) Attorney, Agent, or Firm — Finnegan, Henderson, Farabow, Garrett & Dunner, L.L.P.

(57) ABSTRACT

A configuration that efficiently executes cryptographic processing to which a plurality of different F-functions are applied is provided. In a configuration that executes cryptographic processing by performing round operations to which different F-functions are selectively applied, a plurality of F-function correspondence tables, each corresponding to one of the F-functions, in which input values and output values or intermediate values are associated with each other are stored in a memory; in accordance with a prescribed cryptographic processing sequence, addresses corresponding to F-functions for the respective rounds are applied to read F-function correspondence tables from the memory; and output values or intermediate values for input values are acquired on the basis of reference to the tables to obtain data transformation results in accordance with the respective F-functions.

10 Claims, 10 Drawing Sheets

U.S. PATENT DOCUMENTS

| | | | |
|---|---|---|---|
| 7,292,693 B1* | 11/2007 | Mittenthal | 380/263 |
| 2002/0015492 A1* | 2/2002 | Ohmori et al. | 380/37 |
| 2003/0023847 A1* | 1/2003 | Ishibashi et al. | 713/169 |
| 2003/0048903 A1* | 3/2003 | Ito et al. | 380/263 |
| 2004/0193898 A1* | 9/2004 | Ochi et al. | 713/189 |
| 2008/0095357 A1* | 4/2008 | Kitamura et al. | 380/28 |
| 2008/0244273 A1* | 10/2008 | Chen et al. | 713/189 |
| 2009/0034718 A1* | 2/2009 | Lin | 380/29 |

FOREIGN PATENT DOCUMENTS

WO    WO 2006046187 A1 *    5/2006

OTHER PUBLICATIONS

L. Xiao, Software performance characterisation of block cipher structure using S-boxes and linear mappings, Oct. 7, 2005.*

J. Wang, A Nobel Round Function Architecture for AES Encryption/Decryption Utilizing Look-up Table, May 18, 2004.*

G.L. Kozina, The Program Complex of Studing Crypto Algorithm Rijndael, Dec. 20, 2004.*

L. Keliher, Provable Security of Substitution-Permutation Encryption Networks Against Linear Cryptanalysis, Aug. 6, 2002.*

A. House, Design of a Flexiable Cryptographic Hardware Module, Nov. 1, 2004.*

Espacenet search, Espacenet Result List, Dec. 2011.*

Khuhu, Fast Software Encryption Functions, Lecture Notes in Computer Science, vol. 537, pp. 476-501, Dec. 1991.*

Nyberg et al, "Generalized Feistel Networks", 1996.*

Wang et al, A novel round function Architecture for AES Encryption/Decryption Utilizing Look-up Table, May 2004.*

Kaisa Nyberg, "Generalized Feistel Networks", pp. 91-104, Finnish Defence Forces, CIS Division, Helsinki, Finland.

Yuliang Zheng et al., "On the Construction of Block Ciphers Provably Secure and Not Relynig on Any Unproved Hypotheses", pp. 461-480, Division of Electrical and Computer Engineering, Yokohama National University, Yokohama, Japan.

* cited by examiner

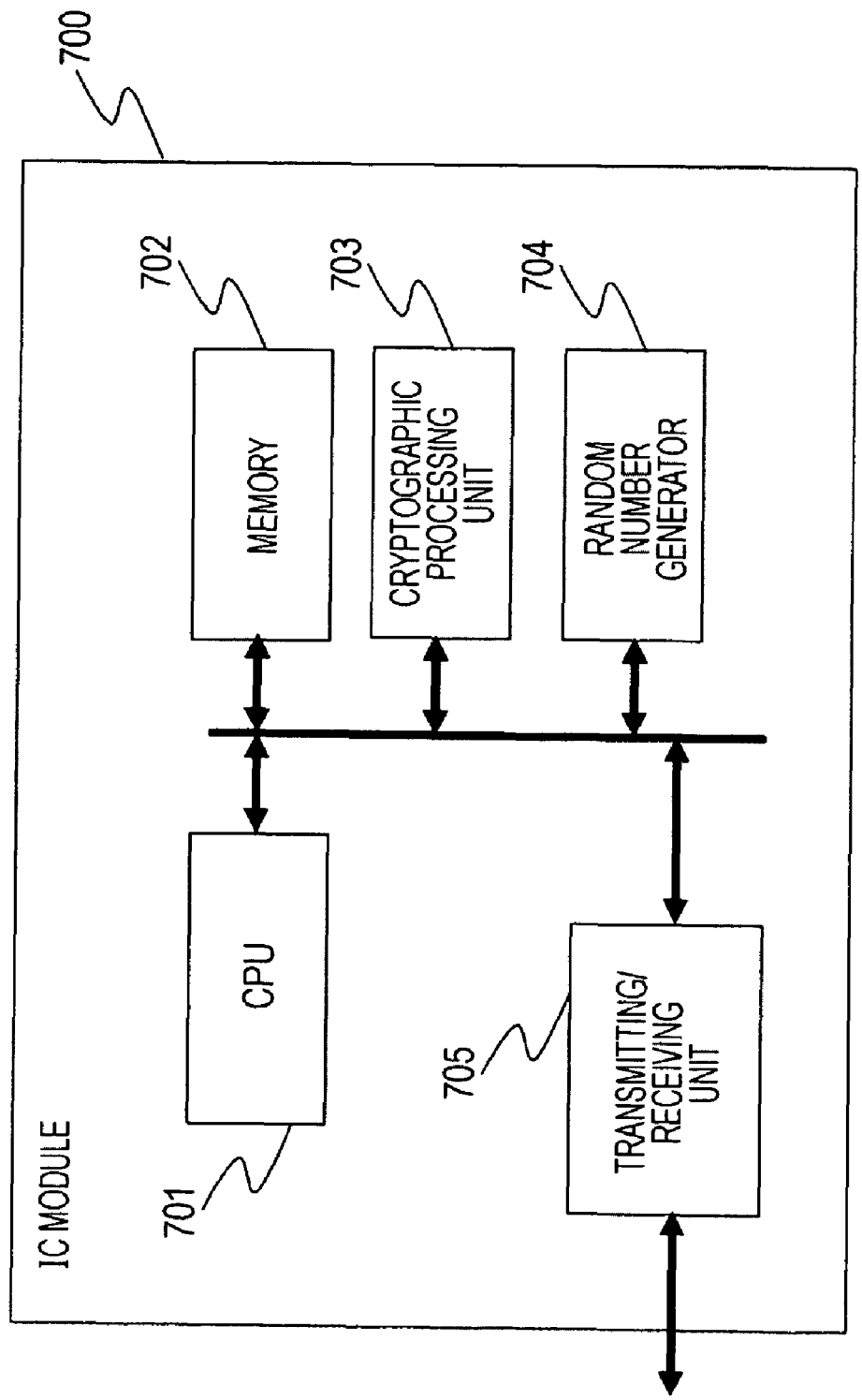

CRYPTOGRAPHIC PROCESSING APPARATUS AND CRYPTOGRAPHIC PROCESSING METHOD, AND COMPUTER PROGRAM

TECHNICAL FIELD

The present relates to a cryptographic processing apparatus and cryptographic processing method, and a computer program. More specifically, the present invention relates to a cryptographic processing apparatus and cryptographic processing method which execute Feistel type common key block cipher processing, and a computer program.

BACKGROUND ART

Nowadays, with the development of network communication and electronic commerce, security ensuring in communication has become an important issue. One method for ensuring security is cryptographic technology, and communication using various encryption techniques is currently done in actuality.

For example, a system has been put into practical use in which a cryptographic processing module is embedded in a compact device such as an IC card to perform data transmission and reception between the IC card and a reader/writer serving as a data reading and writing apparatus to perform authentication processing or encryption and decryption of transmission and reception data.

There are various cryptographic processing algorithms, which are broadly classified into a public key cryptographic scheme in which an encryption key and a decryption key are set as different keys, for example, a public key and a private key, and a common key cryptographic scheme in which an encryption key and a decryption key are set as a common key.

The common key cryptographic scheme has various algorithms, one of which is a scheme in which a plurality of keys are generated based on a common key and data transformation processing in units of a block (such as 64-bit or 128-bit) is repeatedly executed using the plurality of generated keys. A typical algorithm with the application of such a key generation scheme and data transformation processing is a common key block cipher scheme.

As typical algorithms for common key block ciphers, for example, the DES (Data Encryption Standard) algorithm, which was formerly the U.S. standard cryptography, the AES (Advanced Encryption Standard) algorithm, which is the current U.S. standard cryptography, etc., have been known.

Such algorithms for common key block ciphers are mainly constituted by round function sections having F-function sections that repeatedly execute the transformation of input data, and a key scheduling section that generates round keys to be applied in the F-function sections in respective rounds of the round function sections. The key scheduling section first increases the number of bits to generate an expanded key on the basis of a master key (main key), which is a private key, and generates, on the basis of the generated expanded key, round keys (sub-keys) to be applied in the F-function sections in the respective rounds of the round function sections.

A known specific structure that executes an algorithm to which such round functions (F functions) are applied is a Feistel structure. The Feistel structure has a structure that transforms plaintext into ciphertext by using simple repetition of round functions (F-functions) serving as data transformation functions. Examples of documents describing cryptographic processing with the application of the Feistel structure include Non-Patent Documents 1 and 2.

However, problems of common key block cipher processing to which the Feistel structure is applied involve leakage of keys due to cryptanalysis. Typical known techniques of cryptanalysis or attack techniques include differential analysis (also called differential cryptanalysis or differential attack) in which multiple pieces of input data (plaintext) having certain differences therebetween and output data (ciphertext) thereof are analyzed to analyze keys applied in respective round functions, and linear analysis (also called linear cryptanalysis or linear attack) in which analysis based on plaintext and corresponding ciphertext is performed.

Easy analysis of keys due to cryptanalysis implies low security of the cryptographic processing therefor. In cryptographic algorithms of the related art, since processes (transformation matrices) applied in linear transformation sections of round function (F-function) sections are equal to each other in rounds of respective stages, analysis is feasible, resulting in easy analysis of keys.

As a configuration to address such a problem, a configuration in which two or more different matrices are arranged in linear transformation sections of round function (F-function) sections in a Feistel structure so that the matrices are switched every round has been proposed. This technology is called a diffusion-matrix switching mechanism (DSM: Diffusion Switching Mechanism, hereinafter referred to as DSM). This DSM enables enhancement of resistance to differential attacks or linear attacks. A cryptographic processing configuration to which such a diffusion-matrix switching mechanism (DSM) is applied is described in, for example, Patent Document 1.

However, the execution of cryptographic processing to which a diffusion-matrix switching mechanism (DSM) is applied requires to implement different round functions (F-functions) in which different matrices are set. It also requires switching in accordance with a sequence, wherein a plurality of round functions are determined in advance, and requires the provision of a new control mechanism. When a cryptographic processing apparatus is constructed, the number of required components increases, which prevents compactness of the apparatus and causes an increase in cost. There is another problem in that the switching control involves a reduction in processing speed.

Patent Document 1: Japanese Unexamined Patent Application Publication No. 2006-72054

Non-Patent Document 1: K. Nyberg, "Generalized Feistel networks", ASIACRYPT '96, SpringerVerlag, 1996, pp. 91-104.

Non-Patent Document 2: Yuliang Zheng, Tsutomu Matsumoto, Hideki Imai: On the Construction of Block Ciphers Provably Secure and Not Relying on Any Unproved Hypotheses. CRYPTO 1989: 461-480

DISCLOSURE OF INVENTION

Technical Problem

The present invention has been made in view of the foregoing problems, and aims to provide a cryptographic processing apparatus and cryptographic processing method, and a computer program in which a cryptographic processing configuration with the application of a diffusion-matrix switching mechanism (DSM) in which two or more different matrices are arranged in linear transformation sections of round function (F-function) sections in a Feistel structure so that the matrices are switched every round is improved to enable the execution of high-speed cryptographic processing without increasing implementation cost.

Technical Solution

A first aspect of the present invention resides in:

a cryptographic processing apparatus that executes Feistel type common key block cipher processing, characterized by including:

a data processing unit that executes round operations for a plurality of rounds by selectively applying at least two or more types of different F-functions as round functions; and a memory having stored therein a plurality of F-function correspondence tables, each corresponding to one of the at least two or more types of different F-functions, in which input values and output values or intermediate values are associated with each other, wherein the data processing unit is configured to in accordance with a prescribed cryptographic processing sequence, acquire addresses for accessing F-function correspondence tables corresponding to F-functions to be applied in respective rounds, access the memory by applying the acquired addresses to read the F-function correspondence tables corresponding to the F-functions for the respective rounds, and acquire, on the basis of reference to the tables, output values or intermediate values for input values to obtain data transformation results in accordance with the respective F-functions.

Furthermore, in an embodiment of the cryptographic processing apparatus of the present invention, it is characterized in that the data processing unit is configured to execute cryptographic processing in accordance with a Feistel structure having a diffusion-matrix switching mechanism (DSM: Diffusion Switching Mechanism) that selectively applies at least two or more different F-functions in which at least two or more different matrices are set as transformation matrices to be applied to linear transformation processes within the F-functions for the respective rounds.

Furthermore, in an embodiment of the cryptographic processing apparatus of the present invention, it is characterized in that the data processing unit is configured to execute cryptographic processing based on a Feistel structure, that executes cryptographic processing according to a setting of the number of data lines (number of divisions) d=2 in which data to be subjected to the cryptographic processing is divided into two segments.

Furthermore, in an embodiment of the cryptographic processing apparatus of the present invention, it is characterized in that the data processing unit is configured to execute cryptographic processing based on an extended Feistel structure that executes cryptographic processing according to a setting of the number of data lines (number of divisions) d≧3 in which data to be subjected to cryptographic processing is divided into three or more segments.

Furthermore, in an embodiment of the cryptographic processing apparatus of the present invention, it is characterized in that the data processing unit is configured to execute a preset cipher function, appropriately switch, on occasion of the execution of the cipher function, on a round-by-round basis, addresses for accessing F-function correspondence tables corresponding to F-functions to be applied in respective rounds to read the F-function correspondence tables corresponding to the F-functions for the respective rounds, and acquire, on the basis of reference to the tables, output values or intermediate values for input values to obtain data transformation results in accordance with the respective F-functions.

Furthermore, in an embodiment of the cryptographic processing apparatus of the present invention, it is characterized in that the memory is configured to have stored therein F-function correspondence tables in which input values for the respective F-functions or data constituting the input values, and output values or intermediate values of the F-functions or data constituting them are associated with each other.

Furthermore, a second aspect of the present invention resides in:

a cryptographic processing method that executes Feistel type common key block cipher processing in an encryption processing apparatus, characterized by including:

a data processing step of, in a data processing unit, executing round operations for a plurality of rounds by selectively applying at least two or more types of different F-functions as round functions, the data processing step including a step of, in accordance with a prescribed cryptographic processing sequence, acquiring addresses for accessing F-function correspondence tables corresponding to F-functions to be applied in respective rounds, a step of executing memory access by applying the acquired addresses to read the F-function correspondence tables corresponding to the F-functions for the respective rounds from a memory having stored therein a plurality of F-function correspondence tables, each corresponding to one of the at least two or more types of different F-functions, in which input values and output values or intermediate values are associated with each other, and a step of referring to the tables read from the memory and acquiring output values or intermediate values for F-function input values to obtain data transformation results in accordance with the respective F-functions.

Furthermore, a third aspect of the present invention resides in:

a computer program that causes Feistel type common key block cipher processing to be executed in a cryptographic processing apparatus, characterized by including:

a data processing step of causing a data processing unit to execute round operations for a plurality of rounds by selectively applying at least two or more types of different F-functions as round functions, the data processing step including a step of, in accordance with a prescribed cryptographic processing sequence, causing acquisition of addresses for accessing F-function correspondence tables corresponding to F-functions to be applied in respective rounds, a step of causing execution of memory access by applying the acquired addresses and causing the F-function correspondence tables corresponding to the F-functions for the respective rounds to be read from a memory having stored therein a plurality of F-function correspondence tables, each corresponding to one of the at least two or more types of different F-functions, in which input values and output values or intermediate values are associated with each other, and a step of causing the tables read from the memory to be referred to and causing acquisition of output values or intermediate values for F-function input values to obtain data transformation results in accordance with the respective F-functions.

Note that a computer program of the present invention is, for example, a computer program that can be provided through a storage medium or a communication medium through which the program is provided in a computer-readable format to a computer system capable of executing various program code, for example, a recording medium such as a CD, an FD, or an MO, or a communication medium such as a network. By providing such a program in a computer-readable format, processing in accordance with the program is realized on a computer system.

Further objects, features, and advantages of the present invention will become more apparent from the more detailed description based on an exemplary embodiment of the present invention, which will be described below, or the accompanying drawings. Note that as used in the description the term system refers to a configuration of a logical set of a plurality of apparatuses, and is not limited to one whose constituent apparatuses are housed in a single housing.

Advantageous Effects

According to a configuration of an exemplary embodiment of the present invention, in a configuration that executes cryptographic processing by performing round operations to which at least two or more types of different F-functions are selectively applied as round functions, a plurality of F-function correspondence tables, each corresponding to one of the F-functions, in which input values and output values or intermediate values are associated with each other are stored in a memory; in accordance with a prescribed cryptographic processing sequence, table-accessing addresses corresponding to F-functions for the respective rounds are applied to read F-function correspondence tables from the memory; and output values or intermediate values for input values are acquired on the basis of reference to the tables to obtain data transformation results in accordance with the respective F-functions. According to the present configuration, respective F-function correspondence tables are acquired according to addresses modified in correspondence with the respective rounds to enable efficient acquisition or calculation of output values corresponding to input values. Various cryptographic processes can be executed merely by, for example, applying one cipher function to modify arguments.

BRIEF DESCRIPTION OF DRAWINGS

FIG. 10 is a diagram showing an example configuration of an IC module serving as a cryptographic processing apparatus that executes cryptographic processing according to the present invention.

BEST MODE FOR CARRYING OUT THE INVENTION

The details of a cryptographic processing apparatus and cryptographic processing method, and a computer program of the present invention will be explained hereinafter. The description will be made in accordance with the following items:
1. SPN Type Feistel Structure
2. Setting Configuration of Diffusion-matrix Switching Mechanism (DSM) for Feistel Structure Having Two Data Lines
3. Setting Configuration of Diffusion-matrix Switching Mechanism (DSM) for Extended Feistel Structure (GFN: Generalized Feistel Network)
4. Processing Configuration by Performing Table Implementation for Different Round Functions to which Different Linear Transformation Matrices Are Applied
5. Example Configuration of Cryptographic Processing Apparatus

[1. SPN Type Feistel Structure]

First, an SPN (Substitution Permutation Network)) type Feistel structure will be explained. A Feistel structure, which is known as a design of common key block ciphers, has a structure that transforms plaintext into ciphertext by using repetition of basic processing units called round functions.

Figure 1:
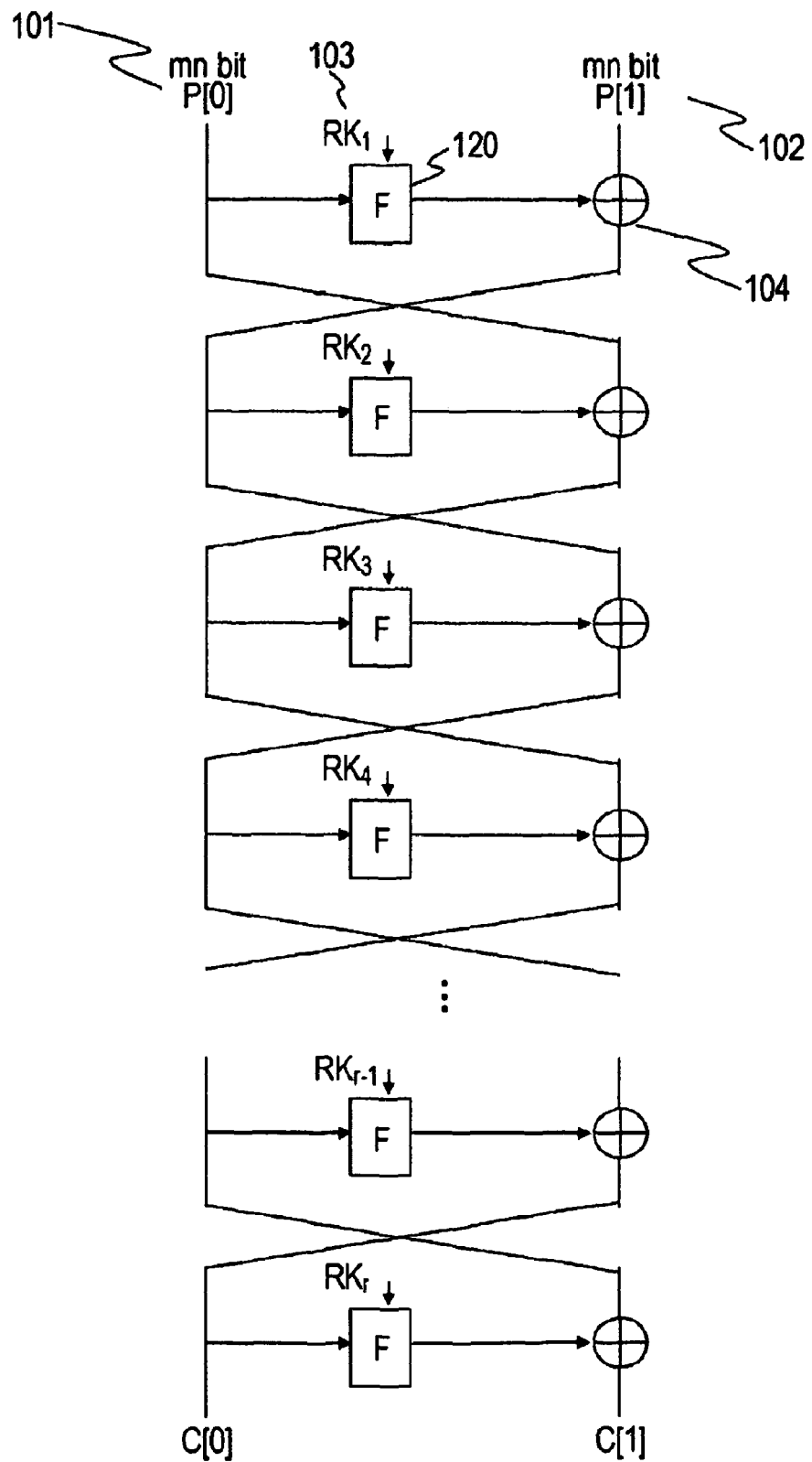
FIG. 1 is a diagram explaining a basic configuration of a Feistel structure.

A basic configuration of the Feistel structure will be explained with reference to FIG. 1. In FIG. 1, an example of a Feistel structure having two data lines having the number of rounds=r, namely, r rounds, is shown. Note that the number of rounds, r, is a parameter determined at the stage of design, and is a value that can be modified according to, for example, the length of an input key.

In the Feistel structure shown in FIG. 1, it is assumed that plaintext to be input as an encryption target has a length of 2 mn bits, where m and n are both integers. First, 2 mn-bit plaintext is divided into two mn-bit input data segments P[0] 101 and P[1] 102, which are set as input values. The example shown in the figure is configured such that an input value is divided into two parts, and is an example configuration in which the number of data lines (number of divisions)=2.

A Feistel structure is expressed by repetition of basic processing units called round functions, and data transformation functions included in respective rounds are called round functions (F-functions) 120. In the configuration of FIG. 1, an example configuration in which the round functions 120 are repeated for r stages is shown.

For example, in the first round, mn-bit input data X and an mn-bit round key $RK_1$ 103 input from a key scheduling section (key generating section), which is not shown in the figures, are input to the F-function 120, and mn-bit data Y is output after a data transformation process is performed in the round function (F-function) 120. The output is subjected to an exclusive-OR operation with input data from the other previous stage (in the case of the first stage, input data $P_L$) in an exclusive-OR section 104, and an mn-bit operation result is output to a next round function. By repeatedly applying this processing, namely, round functions (F-functions) corresponding to only the designated number of rounds (r), an encryption process is completed, and ciphertext data segments C[0] and C[1] are output. In a decryption process in a Feistel structure in which round functions (F-functions)

executed in respective rounds have the same configuration, it is only required to reverse the order in which round keys are inserted, and there is no need to configure an inverse function.

A configuration of the round functions (F-functions) 120 set as functions for the respective rounds will be explained with reference to FIG. 2. FIG. 2(a) is a diagram showing an input and output to and from a round function (F-function) 120 for one round, and FIG. 2(b) is a diagram showing the details of the configuration of the round function (F-function) 120. As shown in FIG. 2(b), the round function (F-function) 120 has a so-called SP type configuration in which a non-linear transformation layer (S layer) and a linear transformation layer (P layer) are connected.

Figure 2:
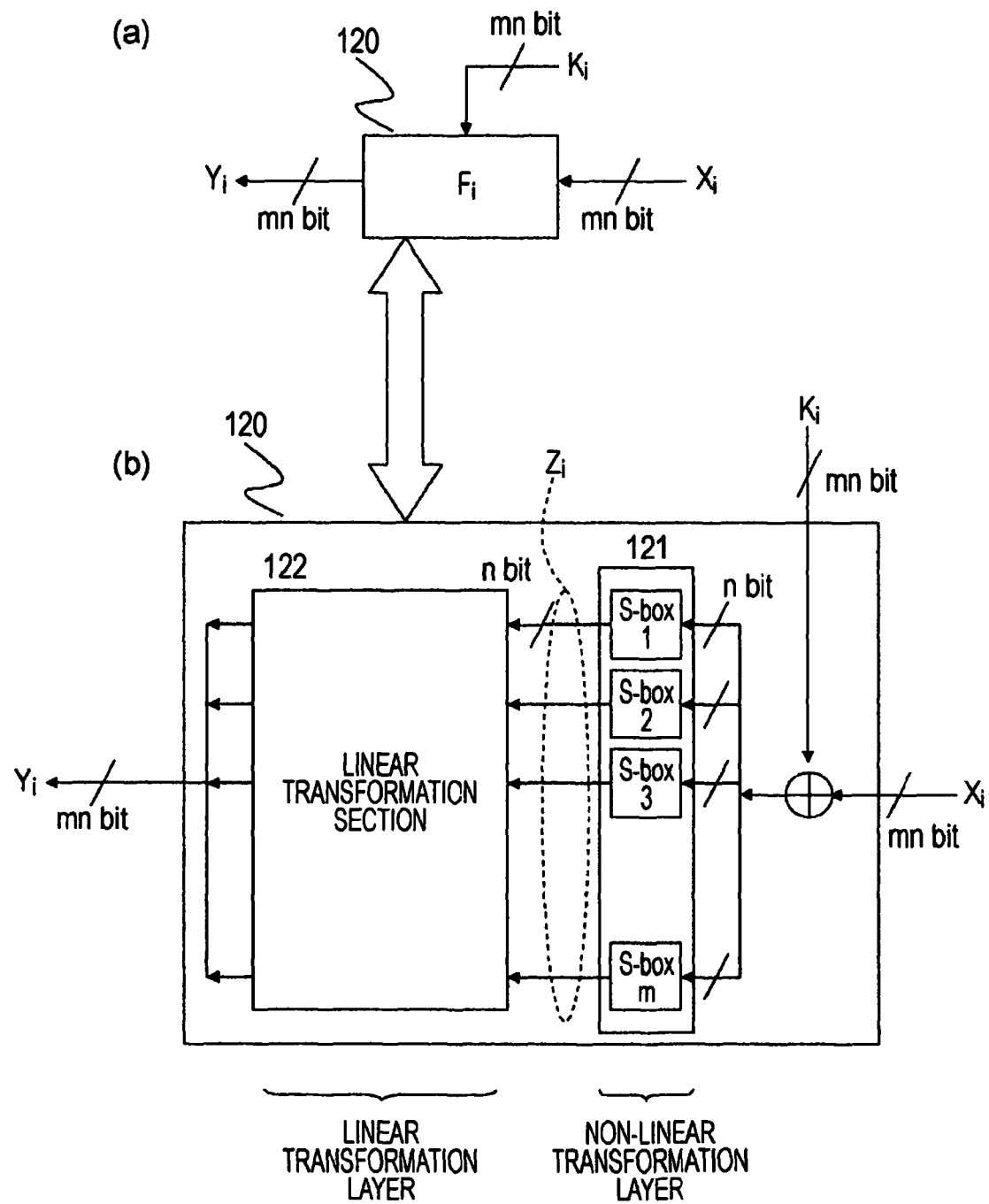
FIG. 2 is a diagram explaining a configuration of an F-function set as a round function section.

The round function (F-function) 120 shown in FIG. 2 is a function with an input/output bit length set to m×n (m, n: integer) bits. Within an SP type F-function, first, an exclusive-OR between key data $K_i$ and data $X_i$ is executed. Next, the non-linear transformation layer (S layer) is applied, and then the linear transformation layer (P layer) is applied.

Specifically, the non-linear transformation layer (S layer) is configured such that m non-linear transformation tables with n-bit input and n-bit output, called S-boxes 121, are arranged. Data of mn bits is divided into n-bit segments which are then input to the corresponding S-boxes 121 so that the data is transformed. In each S-box, for example, a non-linear transformation process to which a transformation table is applied is executed.

The linear transformation layer (P layer) is constituted by a linear transformation section 122. The linear transformation section 122 receives an input of an mn-bit output value Z, which is output data from the S-boxes 121, and applies linear transformation to the input to output an mn-bit result. The linear transformation section 122 executes a linear transformation process such as a process of permuting input bit positions, and outputs an mn-bit output value Y. The output value Y is exclusive-ORed with the input data from the previous stage, and is set as an input value of an F-function for the next round.

Note that in the configuration of the present exemplary embodiment explained hereinafter, linear transformation executed in the linear transformation section 122 serving as the linear transformation layer (P layer) is defined as linear transformation performed by applying an mn×mn matrix defined over $GF(2^n)$, and it is assumed that a matrix included in the i-th round is called $M_i$.

Figure 3:
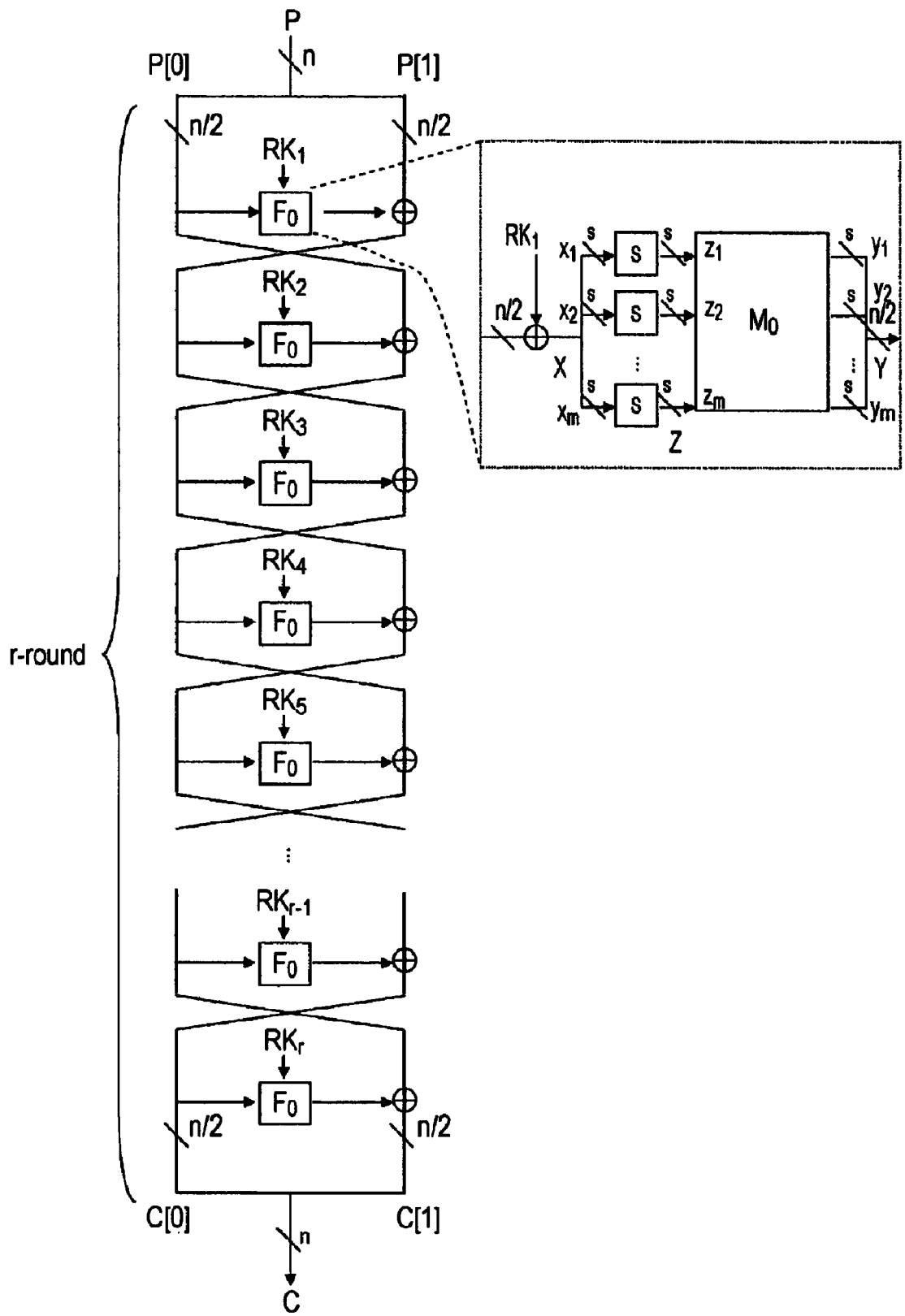
FIG. 3 is a diagram showing an example of an SPN type Feistel structure in which the number of rounds is set to r.

An SPN type Feistel structure in which the number of rounds is set to r has a configuration as shown in FIG. 3. Plaintext P of n bits is divided into halves P[0] and P[1]. A round function $F_0$ to which a round key $RK_1$ is input is applied to P[0], and an exclusive-OR operation (EXOR) between the result thereof and P[1] is executed. The result of this operation is set as a left input on the next round and P[0] is set as a right input thereon. Subsequently, round functions are repeatedly applied a prescribed number of times (r times) to yield a final output C. This configuration is common to all rounds, in which round functions (F-functions) are the same.

Within the round function $F_0$, first, data input to the round function is subjected to an exclusive-OR operation (EXOR) with the round key. The result thereof is assumed to be X (n/2-bit). X is divided into m s-bit data segments. The segments are respectively represented by $x_1, x_2, \ldots, x_m$ (X= ($x_1 \| x_2 \| \ldots \| x_m$)), where a∥b denotes concatenation data of a and b.

The respective data segments $x_1$ are individually input to s-bit input/output non-linear transformations S, namely, S-boxes. The outputs of the S-boxes are respectively represented by $z_1, z_2, \ldots, z_m$ (Z=$z_1 \| z_2 \| \ldots \| z_m$). Z is further input to the linear transformation section, and is subjected to a matrix operation to which an m×m matrix M0 is applied to yield the final output Y.

In this manner, the Feistel structure has a structure that transforms plaintext into ciphertext by using simple repetition of round functions (F-functions) serving as data transformation functions. However, problems of common key block cipher processing to which the Feistel structure is applied involve leakage of keys due to cryptanalysis. For example, there may be a risk that analysis is made using differential analysis (also called differential cryptanalysis or differential attack) or linear analysis (also called linear cryptanalysis or linear attack) in which analysis based on plaintext and corresponding ciphertext is made. Easy analysis of keys due to cryptanalysis implies low security of the cryptographic processing therefor.

[2. Setting Configuration of Diffusion-matrix Switching Mechanism (DSM) for Feistel Structure Having Two Data Lines]

As explained earlier, in cryptographic processing to which a Feistel structure is applied, a configuration to which a diffusion-matrix switching mechanism (DSM: Diffusion Switching Mechanism, hereinafter referred to as DSM) is applied has been proposed as a configuration with enhanced resistance to differential attacks or linear attacks. A cryptographic processing configuration to which the diffusion-matrix switching mechanism (DSM) is applied is described in, for example, Japanese Unexamined Patent Application Publication No. 2006-72054. DSM is configured to, instead of setting matrices applied in linear transformation sections of round function (F-function) sections in the Feistel structure to be the same for all rounds, arrange at least two or more different matrices for the respective rounds. This DSM enables enhancement of resistance to differential attacks or linear attacks.

An overview of this DSM will be explained. In a Feistel structure, in a case where a diffusion-matrix switching mechanism (DSM) is applied, matrices to be applied in linear transformation sections (P layers) of round function (F-function) sections constituting the Feistel structure are a plurality of different matrices. For example, in the Feistel structure with r rounds, unlike that shown in FIG. 1 or 3, all matrices applied in the respective rounds are not set to be the same linear transformation matrix but at least two or more types of matrices are arranged according to a specific rule.

Figure 4:
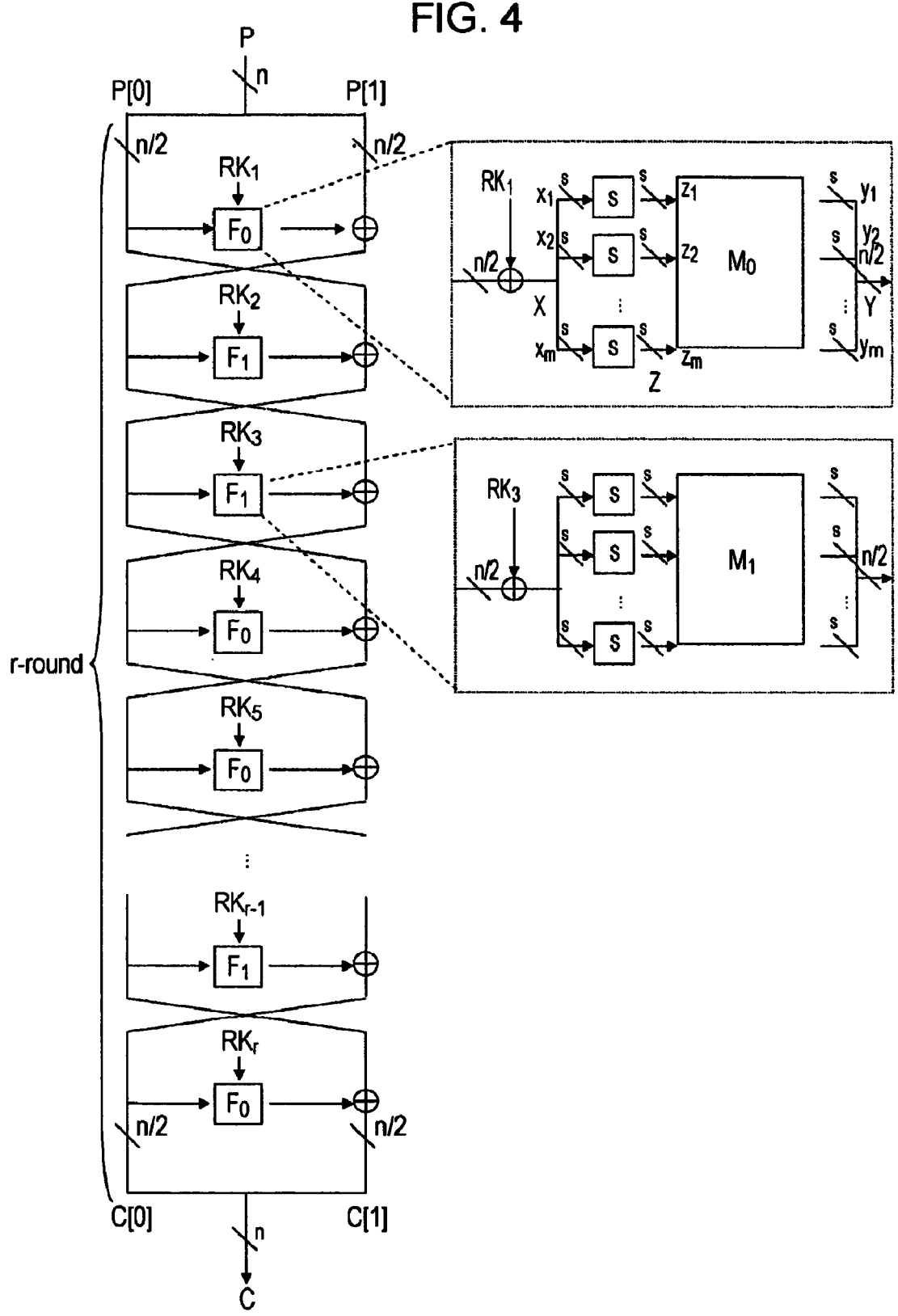
FIG. 4 is a diagram showing an example of a Feistel structure in which a diffusion-matrix switching mechanism (DSM) in which two different linear transformation matrices $M_0$ and $M_1$ are arranged in linear transformation layers of round functions (F-functions) for respective rounds is realized.

For example, FIG. 4 shows an example of a Feistel structure in which a diffusion-matrix switching mechanism (DSM) in which two different linear transformation matrices $M_0$ and $M_1$ are arranged in linear transformation layers of round functions (F-functions) on respective rounds is realized. In the example of the Feistel structure shown in FIG. 4, an F-function $F_0$ represents a round function (F-function) that executes a linear transformation process to which the linear transformation matrix $M_0$ is applied, and an F-function $F_1$ represents a round function (F-function) that executes a linear transformation process to which the linear transformation matrix $M_1$ is applied.

The two linear transformation matrices $M_0$ and $M_1$ are constituted by different matrices.

Note that in order to realize a diffusion-matrix switching mechanism (DSM), it is necessary that matrices to be applied meet predetermined conditions. One of the conditions is a restriction on the number of branches (Branch). This restriction will be explained hereinafter.

In the number of branches for each of the plurality of different matrices $M_0$ to $M_n$ applied to linear transformation in the round function sections in the Feistel structure, a minimum value of the number of branches within a matrix applied: $B_1^D$, and minimum values of the numbers of branches corresponding to combined matrices including a plurality of matrices to be applied: $B_2^D$, $B_3^D$, $B_2^L$ are defined as follows:

$$B_1^D = \min_i(\text{Branch}_n(M_i))$$

$$B_2^D = \min_i(\text{Branch}_n([M_i \mid M_{i+2}]))$$

$$B_3^D = \min_i(\text{Branch}_n([M_i \mid M_{i+2} \mid M_{i+4}]))$$

$$B_2^L = \min_i(\text{Branch}_n([{}^tM_i^{-1} \mid {}^t M_{i+2}^{-1}]))$$

[Equation 1]

In the above equation, $M_i$ denotes a linear transformation matrix to be applied to the linear transformation process for the i-th round in the Feistel structure, $[M_i|M_{i+2}| \ldots ]$ denotes a combined matrix obtained by concatenating the respective matrices, namely, $M_i|M_{i+2}| \ldots$, ${}^tM$ denotes a transposed matrix of the matrix M, and $M^{-1}$ denotes an inverse matrix of the matrix M.

In the above equation, specifically, $B_2^D$, $B_3^D$, $B_2^L$ represents a minimum value of the number of branches of a combined matrix including matrices included in F-functions for two or three rounds which are consecutive every other round in the Feistel structure.

For example, it is known that the respective matrices are set so that the respective numbers of branches described above satisfy the following conditions:

$B_2^D \geq 3, B_3^D \geq 3$, and $B_2^L \geq 3$, whereby the resistance to differential attacks or linear attacks can be enhanced in the Feistel structure.

Note that the subscripts and superscripts in $B_1^D$, $B_2^D$, $B_3^D$, and $B_2^L$ have the following meanings:

"n" of $B_n^D$ represents the number of matrices combined, "D" of $B_n^D$ represents a condition for resistance to differential attacks (Differential Attack), and "L" of $B_n^L$ represents a condition for resistance to linear attacks (Linear Attack).

In this manner, with the application of a diffusion-matrix switching mechanism (DSM) in which two or more different linear transformation matrices are arranged in linear transformation layers of round functions (F-functions) for respective rounds, resistance to differential attacks or linear attacks can be enhanced.

In the configuration shown in FIG. 4, two different matrices $M_0$ and $M_1$ are applied, and a Feistel structure constituted by a round function (F-function) $F_0$ that executes a linear transformation process to which the linear transformation matrix $M_0$ is applied and a round function (F-function) $F_1$ that executes a linear transformation process to which the linear transformation matrix $M_1$ is applied is shown. However, the number of different linear transformation matrices to be applied is not limited to two, and a configuration to which three, four, . . . types of matrices are applied may be provided.

Figure 5:
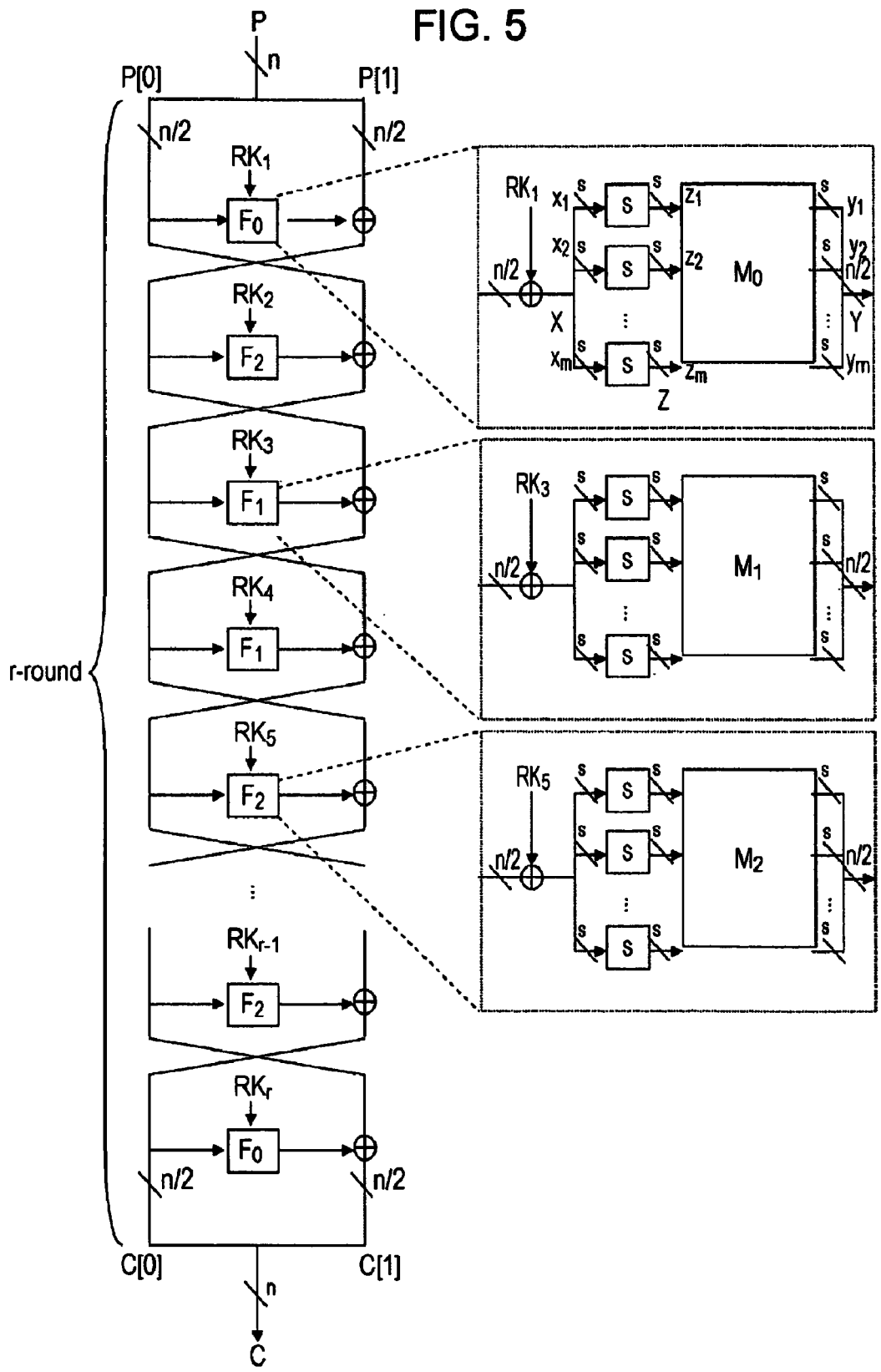
FIG. 5 is a diagram showing an example of a Feistel structure to which three matrices $M_0$, $M_1$, and $M_2$ are applied.

FIG. 5 shows an example of a Feistel structure to which three matrices $M_0$, $M_1$, and $M_2$ are applied. In the example of the Feistel structure shown in FIG. 5, an F-function $F_0$ represents a round function (F-function) that executes a linear transformation process to which the linear transformation matrix $M_0$ is applied, an F-function $F_1$ represents a round function (F-function) that executes a linear transformation process to which the linear transformation matrix $M_1$ is applied, and an F-function $F_2$ represents a round function (F-function) that executes a linear transformation process to which the linear transformation matrix $M_2$ is applied.

The three linear transformation matrices $M_0$, $M_1$, and $M_2$ are constituted by different matrices.

In this manner, the diffusion-matrix switching mechanism (DSM) is adapted to execute round functions by arranging a plurality of different linear transformation matrices $M_0$, $M_1$, . . . that execute different linear transformation processes in linear transformation layers of round functions (F-functions) for respective rounds. This configuration enables enhancement of resistance to differential attacks or linear attacks.

[3. Setting Configuration of Diffusion-Matrix Switching Mechanism (DSM) for Extended Feistel Structure (GFN: Generalized Feistel Network)]

Next, an extended Feistel structure (GFN: Generalized Feistel Network) will be explained. The Feistel structure explained with reference to FIGS. 1 to 5 is configured to divide input data P into two data lines P[0] and P[1] to execute processing. The number of divisions of input data is called the number of data lines (number of divisions). In the Feistel structure explained with reference to FIGS. 1 to 5, the number of data lines (number of divisions) d=2 is set.

In cryptographic processing to which a Feistel structure is applied, the number of data lines (number of divisions) d can be set to a number greater than or equal to 3, and a Feistel structure in which the number of data lines (number of divisions) is set to an arbitrary number: d greater than or equal to 3 is defined as an extended Feistel structure (GFN: Generalized Feistel Network). Even in such an extended Feistel structure (GFN), a diffusion-matrix switching mechanism (DSM) can be applied, and the application of the diffusion-matrix switching mechanism (DSM) enables enhancement of resistance to cryptographic attacks.

Figure 6:
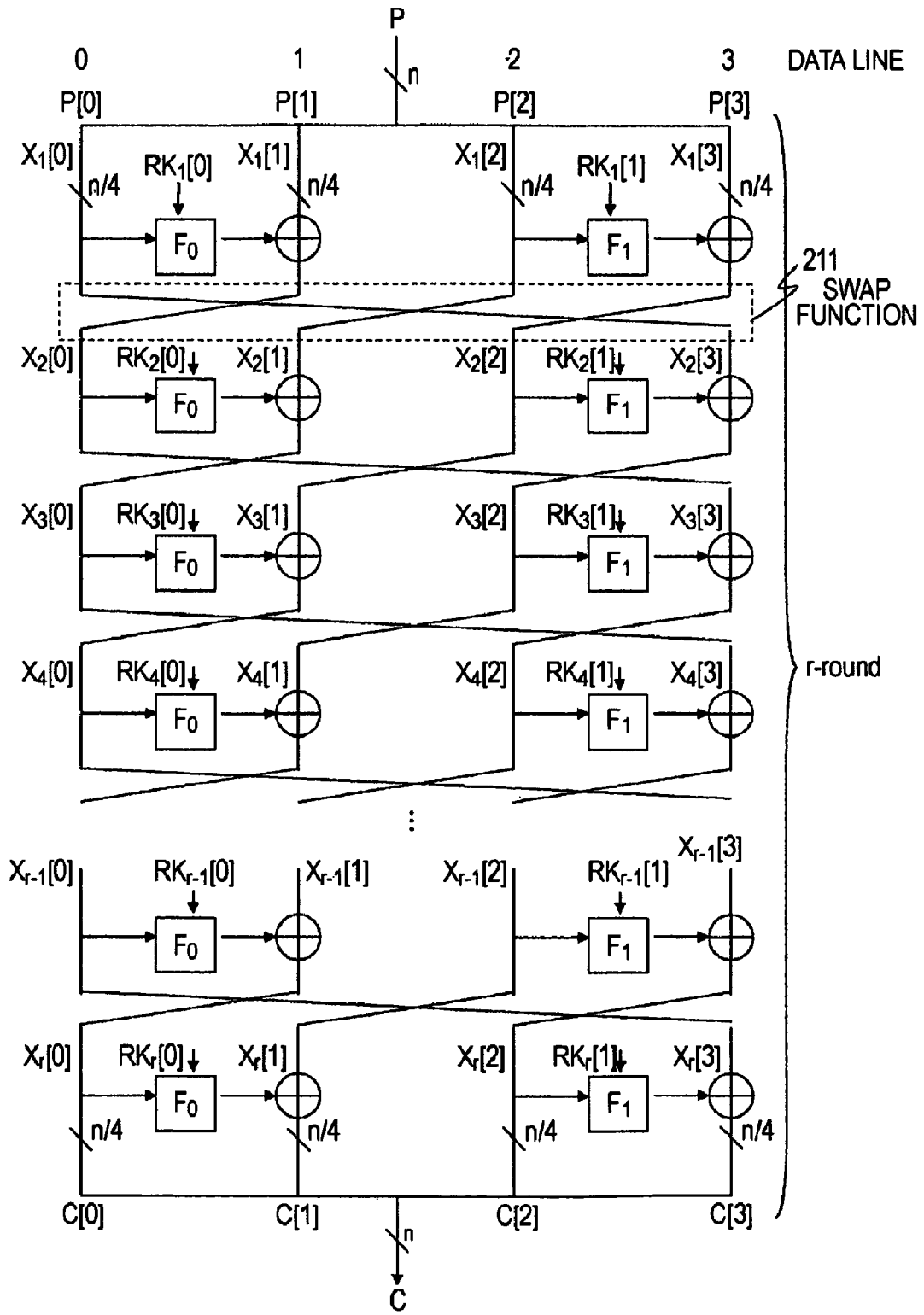
FIG. 6 is a diagram showing an example configuration of an encryption function having an extended Feistel structure (GFN) having a diffusion-matrix switching mechanism (DSM).

FIG. 6 shows an example configuration of an encryption function having an extended Feistel structure (GFN) having a diffusion-matrix switching mechanism (DSM). The example shown in FIG. 6 is an example configuration of an encryption function of an extended Feistel structure (GFN) having a diffusion-matrix switching mechanism (DSM), wherein the number of data lines (number of divisions) d is set to d=4.

As described previously, an extended Feistel structure (GFN) having a diffusion-matrix switching mechanism (DSM) is configured to arrange two or more different matrices in linear transformation sections of round function (F-function) sections in a Feistel structure so that the matrices are switched every round. DSM enables enhancement of resistance to differential attacks or linear attacks. In the example shown in FIG. 6, F-functions $F_0$ and $F_1$ are configured to execute data transformation to which different linear transformation matrices are applied. Note that linear transformation matrices to be applied in those F-functions are set to matrices satisfying certain specific conditions, thus enabling significant enhancement of resistance to differential attacks or linear attacks. This configuration is described in detail in Japanese Patent Application No. 2006-206376, which is a prior application filed by the present applicant.

In the configuration of the encryption function shown in FIG. 6, the input is plaintext P. The plaintext P is divided into four data lines P[0], P[1], P[2], and P[3] (the number of divisions=4), and data transformation to which the F-function $F_0$ or $F_1$ is applied is sequentially executed in respective rounds to output C[0], C[1], C[2], and C[3], which constitute ciphertext C, as results of the transformation for r rounds. In the F-function $F_0$ or $F_1$ for the respective rounds, a round key (sub-key) $RK_i[0]$ or $RK_i[1]$ serving as an element constituting an expanded key generated on the basis of a master key (main key) supplied from a key scheduling section, which is not shown in the figures, is input and applied to data transformation. Note that "i" of the key $RK_i[n]$ denotes a round, and "n" denotes the identifier of a round key in the same round.

As shown in FIG. 6, in an extended Feistel structure (GFN) having a diffusion-matrix switching mechanism (DSM), a swapping process for permuting the respective data lines is executed in portions where the respective rounds are switched. As shown in FIG. 6, a swap function 211 is applied to outputs of the respective data lines at the time of switching between the respective rounds to set the lines to be input in a next round, which correspond to the outputs of the individual data lines.

In FIG. 6, when data lines are represented by, as shown in the upper stage of FIG. 6, data lines 0, 1, 2, and 3 from the left, the permutation of the outputs of the four lines in a preceding round and the lines to be input for the subsequent round is switched using the swap function 211 as follows:

The output of the data line 0 in the preceding round is set as the input of the data line 3 in the subsequent round.

The output of the data line 1 in the preceding round is set as the input of the data line 0 in the subsequent round.

The output of the data line 2 in the preceding round is set as the input of the data line 1 in the subsequent round.

The output of the data line 3 in the preceding round is set as the input of the data line 2 in the subsequent round.

A function that executes such line permutation processing is a swap function applied in encryption processing.

In an extended Feistel structure (GFN) having an arbitrary number greater than or equal to the number of data lines (number of divisions) d=3, a process in which one or more round functions are executed in each round and thereafter line switching processing is performed to execute the subsequent round function is repeated.

Also in such an extended Feistel structure (GFN) having an arbitrary number greater than or equal to the number of data lines (number of divisions) d=3, linear transformation matrices to be applied in round functions (F-functions) are set as different matrices satisfying certain specific conditions, thus enabling significant enhancement of resistance to differential attacks or linear attacks.

[4. Processing Configuration by Performing Table Implementation for Different Round Functions to which Different Linear Transformation Matrices are Applied]

The cryptographic processing configuration to which a Feistel structure or extended Feistel structure employing a diffusion-matrix switching mechanism (DSM) is applied, as described above, has an advantage in that resistance to differential attacks or linear attacks is significantly enhanced, but on the other hand, has the following problems:

a need to implement different round functions (F-functions) in which different matrices are set, a need to provide a new control mechanism in which a plurality of round functions are determined in advance and switching is performed according to a sequence, and therefore, when a cryptographic processing apparatus is constructed, the number of required components increases, which prevents compactness of the apparatus and causes an increase in cost. There is another problem in that the switching control involves a reduction in processing speed.

A configuration that solves such problems will be explained hereinafter, that is, a processing configuration by performing table implementation for different round functions to which different linear transformation matrices are applied.

Various configurations with the application of software and/or hardware are available as configurations for implementing a common key cipher having round functions (F-functions). A configuration for processing F-functions requires S-boxes serving as non-linear transformation sections and matrix operation sections serving as linear transformation sections, each of which can be configured in hardware by a logic circuit or can be configured using a table transformation table. A technique called table (table look-up) implementation is optimum in a case where high-speed performance is demanded.

The table look-up (table) implementation is an implementation technique that involves, instead of performing actual operations, storing pre-computed operation results corresponding to various inputs in a memory space using a table (permutation table) and referring to the table to obtain a desired output value. For example, in a case where a computation such as $$f(x)=x^3$$

is to be performed, with the provision of a table (permutation table), named ftab, having the following values, the result of $x^3$ can be obtained by referring to the contents of ftab without performing the actual computation of $x^3$.

$$ftab[0]=0(=0^3),$$

$$ftab[1]=1(=1^3),$$

$$ftab[2]=8(=2^3),$$

$$ftab[3]=27(=3^3),$$

$$ftab[4]=64(=4^3),$$

The above is an example of the table ftab having a configuration in which when 0, 1, 2, 3, and 4 are present as input values, 0, 1, 8, 27, and 64 are acquired as outputs.

In this manner, an F-function applies a table look-up (table) implementation configuration. Output values corresponding to input values of each required F-function are prepared in advance as a table and are stored in a memory of a cryptographic processing apparatus. Tables for respective F-functions are configured to be acquirable on the basis of respective addresses indicating the table storage positions in the memory. According to this method, it is possible to easily permute F functions without reducing the execution speed. As an applied use of this, only the addresses of the tables for the F-functions at the even-numbered stages are given from outside, whereby an encryption function and a decryption function can be modified without using functions.

Figure 7:
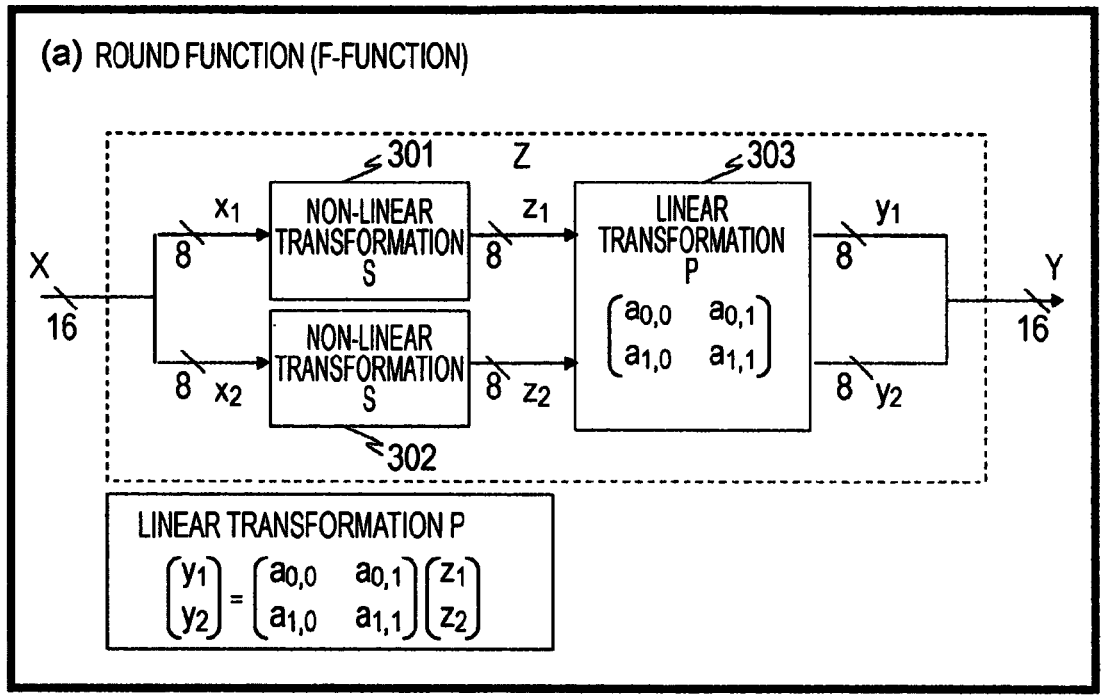
FIG. 7 is a diagram explaining a table configuration for determining an output from an input of an F function.

For example, a table configuration for determining an output of a 16-bit input/output F-function from an input will be explained with reference to FIG. 7. A round function (F-function) shown in FIG. 7(a) is configured to include two S-boxes 301 and 302 and one linear transformation section 303. In this configuration, an input X (16-bit) is divided into two 8-bit segments $x_1$ and $x_2$. Next, $x_1$ and $x_2$ are input to the S-boxes 301 and 302 that execute an 8-bit input/output non-linear transformation process, respectively, and outputs $z_1$ and $z_2$ are obtained. Those $z_1$ and $z_2$ are subjected to linear transformation in the linear transformation section 303 to obtain results $y_1$ and $y_2$ thereof, which are then concatenated to yield a final output Y. For example, linear transformation performed in the linear transformation section 303 is computed as follows:

$$\begin{pmatrix} y_1 \\ y_2 \end{pmatrix} = \begin{pmatrix} a_{0,0} & a_{0,1} \\ a_{1,0} & a_{1,1} \end{pmatrix} \begin{pmatrix} z_1 \\ z_2 \end{pmatrix} \quad \text{[Equation 2]}$$

$$y_1 = a_{0,0} \cdot z_1 \oplus a_{0,1} \cdot z_2$$

$$y_2 = a_{1,0} \cdot z_1 \oplus a_{1,1} \cdot z_2$$

Such non-linear processes performed in the S-boxes or matrix operations performed in the linear transformation section can be set so as to determine an output from input values using logic circuits or the like.

That is, logic circuits that execute, as non-linear processing operations to be performed in the S-boxes, the following operations:

$$z_1 = S(x_1)$$

$$z_2 = S(x_2)$$

are constructed, and logic circuits that execute, as operations to be performed in the linear transformation section, the following operations:

$$y_1 = a_{0,0} z_1 (\text{EXOR}) a_{0,1} z_2$$

$$y_2 = a_{1,0} z_1 (\text{EXOR}) a_{1,1} z_2$$

are further constructed, thus enabling achievement of a configuration for determining results by applying the logic circuits. However, the construction of logic circuits involves problems of increased implementation area as well as reduced processing speed.

Thus, a process of computing operation portions in advance, storing a table including output values corresponding to various inputs, and referring to the table to obtain an output is optimum for increased speed. For example, in the round function shown in FIG. 7, a table shown in FIG. 7(b) can be utilized.

In this example, two tables $TAB_0[t]$ and $TAB_1[t]$ below are applied, where t is a variable for values input to the two S-boxes 301 and 302:

$$TAB_0[t] = (a_{0,0} S(t) \| a_{1,0} S(t))$$

$$TAB_1[t] = (a_{0,1} S(t) \| a_{1,1} S(t))$$

The input value [t] is 8-bit data corresponding to the values $x_1$ and $x_2$ input to the two S-boxes 301 and 302, and data acquired from the tables by $TAB_0[t]$ and $TAB_1[t]$, that is, $$(a_{0,0} S(t) \| a_{1,0} S(t))$$

$$(a_{0,1} S(t) \| a_{1,1} S(t))$$

are each 16-bit data.

Based on the 16-bit data acquired by $TAB_0[t]$ and $TAB_1[t]$, the final output Y of the round functions is determined. The output Y can be calculated using a process for performing EXOR between a result obtained by inserting $x_1$ into $TAB_0[\ ]$ and a result obtained by inserting $x_2$ into $TAB_1[\ ]$, that is, $$Y = TAB[x_1] (\text{EXOR}) TAB[x_2].$$

The above process will be described in more detail as follows:

$$Y = (y_1 \| y_2) = (a_{0,0} S(x_1) \| a_{1,0} S(x_1)) (\text{EXOR}) (a_{0,1} S(x_2) \| a_{1,1} S(x_2))$$

In a case where a technique utilizing those tables is applied, a process of referring to each of the tables, namely, the table $TAB_0[\ ]$ and the table $TAB_1[\ ]$, is executed once for each to determine outputs $TAB_0[x_1]$ and $TAB_0[x_2]$ corresponding to the inputs $x_1$ and $x_2$. That is, $$TAB_0[x_1] = (a_{0,0} S(x_1) \| a_{1,0} S(x_1))$$

$$TAB_1[x_2] = (a_{0,1} S(x_2) \| a_{1,1} S(x_2))$$

Next, those two values $TAB_0[x_1]$ and $TAB_1[x_2]$ acquired from the tables is subjected to an exclusive-OR operation (EXOR) once.

With those processes, the processing result of one round function can be obtained. That is, as processes, it is only required to refer to a table twice and to perform an exclusive-OR operation (EXOR) once. Therefore, as far as the tables can be referred to at a sufficiently high speed, the F-functions can be processed at a significantly high speed.

The present invention proposes a configuration in which the table reference process described above is applied to round operations in cryptographic processing to which the Feistel structure or extended Feistel structure employing a diffusion-matrix switching mechanism (DSM), which has been explained earlier, is applied. As explained earlier, the diffusion-matrix switching mechanism (DSM) is a scheme which, with the appropriate use of different round functions (F-functions) to which a plurality of different linear transformation matrices are applied, allows dramatic enhancement of security as compared with a technique using a single F-function. In this scheme, a plurality of different F-functions are used, according to the number of which security parameters or implementation characteristics varies.

In a case where the diffusion-matrix switching mechanism (DSM) is used, it is necessary to apply different round functions on a round-by-round basis, and switching control of the round functions (F-functions) is necessary. One example of implementation configuration is that, for example, in a configuration utilizing three different round functions (F-functions) having three different linear transformation matrices, a setting is made so as to prepare three F-functions $F_0$, $F_1$, and $F_2$.

According to this implementation configuration, various cryptographic processes are realized by selection control of the round functions (F-functions). For example, in a case where cryptographic processing using the SPN type Feistel structure utilizing only one round function (F-function) $F_0$, which has been described earlier with reference to FIG. 3, is performed, it is configured to invoke and apply the F-function $F_0$ for all rounds.

Alternatively, in a case where a cryptographic process in accordance with the DSM-applied Feistel structure utilizing two F-functions $F_0$ and $F_1$ having two different linear transformation matrices $M_0$ and $M_1$, which has been described earlier with reference to FIG. 4, is performed, it is configured to invoke and apply the two F-functions $F_0$ and $F_1$ for the respective rounds according to a prescribed sequence.

Alternatively, in a case where a cryptographic process in accordance with the DSM-applied Feistel structure utilizing three F-functions $F_0$, $F_1$, and $F_2$ having three different linear transformation matrices $M_0$, $M_1$, and $M_2$ which has been described earlier with reference to FIG. 5, is performed, it is configured to invoke and apply the three F-functions $F_0$, $F_1$, and $F_2$ for the respective rounds according to a prescribed sequence.

In this manner, three encryption functions can be executed using one program without modifying an encryption section of the main body.

Accordingly, if F-functions can be permuted timely, various applied uses are possible. It is therefore desirable that F-functions be easily permutable particularly in the DSM.

The simplest conceivable technique for solving this problem is in a form in which F-function sections are input from outside as functions. In this technique, functions that execute a plurality of F-function sections are created. Those functions are input to an encryption function to thereby realize the switching of the F-functions. This technique, however, requires the plurality of F-functions to be invoked a plurality of times by the encryption function. In general, in block ciphers executed at one time for a significantly short duration, a plurality of invocations of other functions (in this case, F-functions) within an encryption function are considered to introduce a significant reduction in the execution speed and the influence thereof is large. Therefore, it is more desirable to switch between the F-function sections without setting them to functions.

A configuration for solving such a problem will be explained with respect to a processing configuration in which a table corresponding to each of different round functions (F-functions) to which different linear transformation matrices are applied is implemented. That is, tables for acquiring output values corresponding to different round functions (F-functions) to which different linear transformation matrices are applied are stored in advance in a memory space of the apparatus. In a case where cryptographic processing in accordance with a Feistel structure to which the diffusion-matrix switching mechanism (DSM) described above is applied is executed, tables to be utilized for the respective rounds are utilized by appropriately switching therebetween. That is, only tables to be utilized are permuted to realize the permutation of the F-functions.

More specifically, for example, a memory address for acquiring a round function (F-function) correspondence table to be applied in each round is set as input information regarding an encryption function that executes cryptographic processing. In a case where the encryption function executes a round function, a memory address corresponding to each round is applied to acquire a table corresponding to a round function (F-function) to be executed in each round from the memory, and a table setting value is acquired on the basis of a predetermined input value. With this process, the permutation of only tables, that is, memory addresses, is equivalent to the permutation of F-functions, resulting in the achievement of high-speed processing. That is, the actual processing involves only changing of the table addresses, and no reduction in the execution speed occurs.

Figure 8:
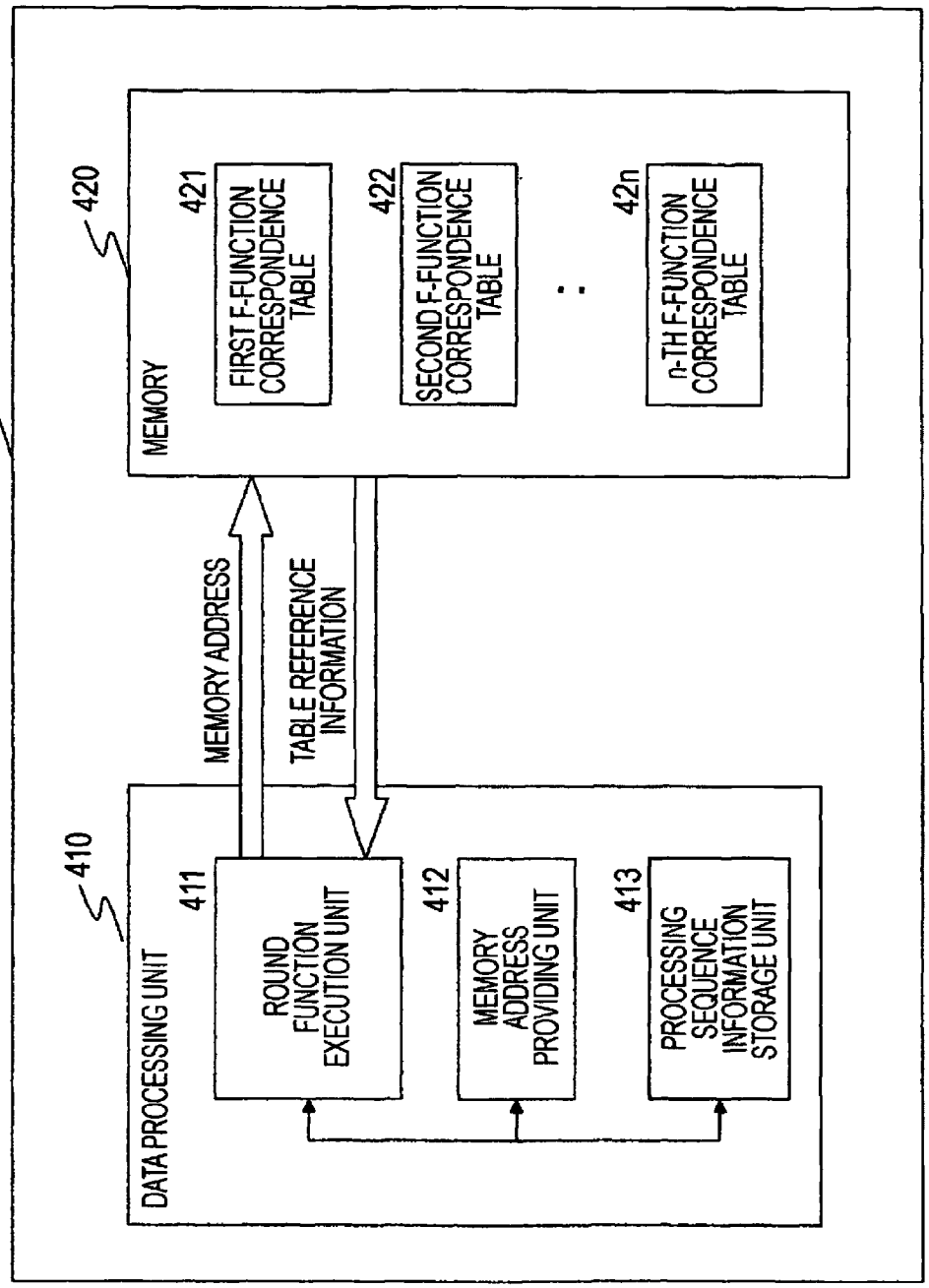
FIG. 8 is a diagram explaining a cryptographic processing configuration utilizing a plurality of tables corresponding to a plurality of different round functions (F-functions).

A cryptographic processing configuration utilizing a plurality of tables corresponding to a plurality of different round functions (F-functions) will be explained with reference to FIGS. 8 and 9. FIG. 8 is a diagram showing one example configuration of a cryptographic processing apparatus 400 according to the present exemplary embodiment. The cryptographic processing apparatus 400 includes a data processing unit 410 that executes, for example, cryptographic processing to which the SPN type Feistel structure described above is applied, cryptographic processing in accordance with a Feistel structure to which a diffusion-matrix switching mechanism (DSM) is applied, or the like, and a memory 420 having stored therein tables corresponding to round functions (F-functions) $F_0, F_1, \ldots$ to which different linear transformation matrices $M_0, M_1, \ldots$, are applied.

The memory 420 holds a plurality of F-function correspondence tables 421, 422 . . . 42n in which tables corresponding to the round functions (F-functions) $F_0, F_1 \ldots$ to which the different linear transformation matrices $M_0, M_1, \ldots$ are applied, that is, output values corresponding to input values of the different F-functions $F_0, F_1 \ldots$ or intermediate values necessary to calculate the output values, are stored in association with respective input values.

Figure 9:
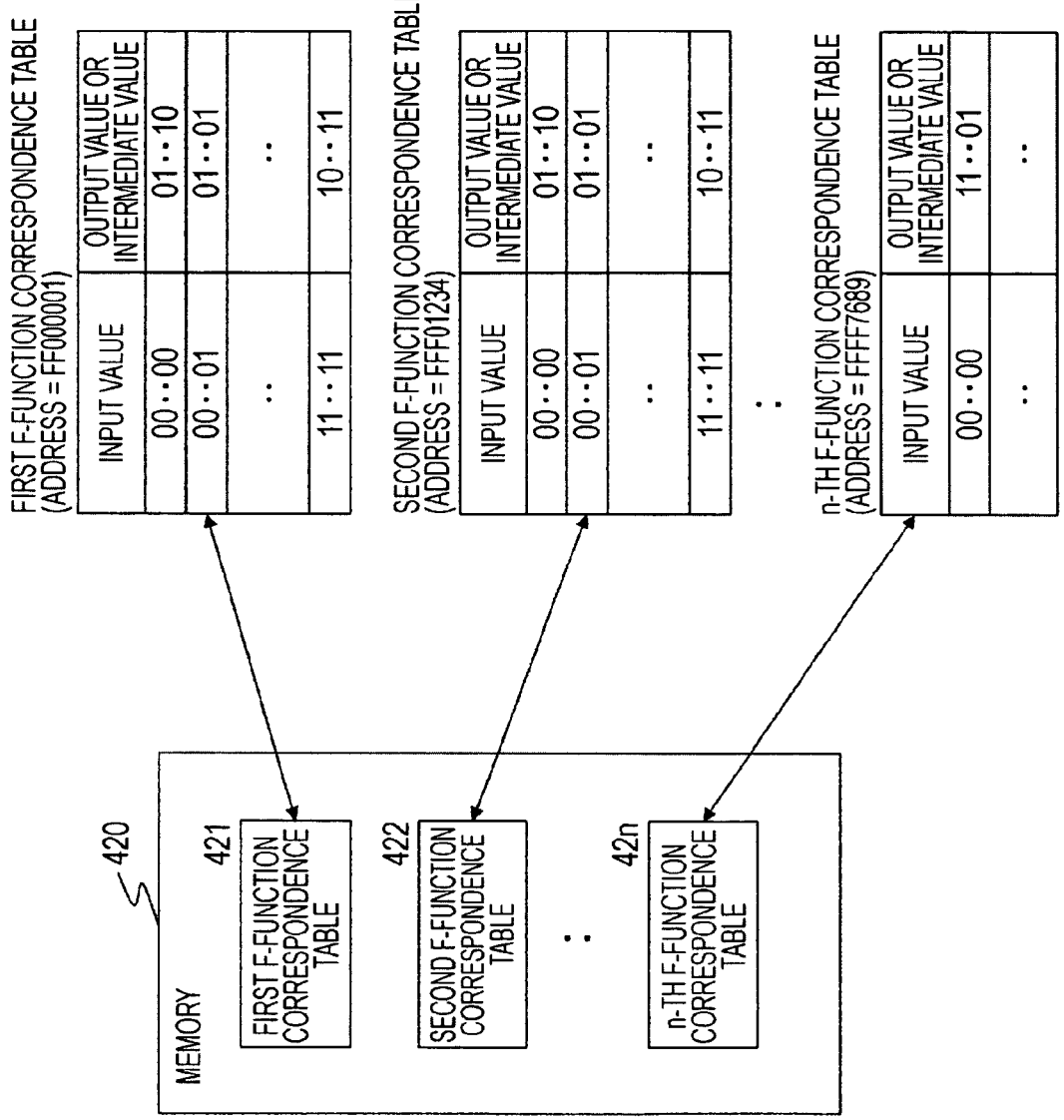
FIG. 9 is a diagram explaining a table stored in a memory to realize a cryptographic processing configuration utilizing a plurality of tables corresponding to a plurality of different round functions (F-functions).

FIG. 9 shows an example of the plurality of F-function correspondence tables 421, 422 . . . 42n stored in the memory 420. The F-function correspondence table 421 is a table corresponding to a first F-function (round function), in which respective input values for the first F-function and output values corresponding to the input values or intermediate values necessary to calculate the output values are set in association with each other. The F-function correspondence table 422 is a table corresponding to a second F-function (round function), in which respective input values for the second F-function and output values corresponding to the input values or intermediate values necessary to calculate the output values are set in association with each other. Subsequently, likewise, n F-function correspondence tables are stored in the memory 420.

Note that input values stored in a table may be input values for the entirety of an F-function or some of values constituting F-function input values, such as input values for respective S-boxes within the F-function. Also, output values may be output values of the F-function or may be intermediate values for calculating the output values. That is, the F-function correspondence tables stored in the memory 420 are configured as tables in which input values for the respective F-functions or data constituting the input values and output values or intermediate values of the F-functions or data constituting them are associated with each other.

Those respective tables are configured to be readable by applying accessing addresses. Addresses corresponding to the respective tables, for example, read addresses of the respective tables such as first F-function correspondence table address=[FF000001]
second F-function correspondence table address= [FFF01234]

are set. A round function execution unit 411 shown in FIG. 8 executes reading of tables by applying addresses corresponding to the F-functions to be applied in the respective rounds.

The data processing unit 410 shown in FIG. 8 includes the round function execution unit 411 that executes round functions, a memory address providing unit 412 that provides the round function execution unit 411 with memory addresses corresponding to the respective tables, which are applied for accessing the F-function correspondence tables to be applied in the respective rounds, and a processing sequence information storage unit 413 having stored therein sequence information of cryptographic processes.

For example, in a case where cryptographic processing in accordance with a Feistel structure in which the diffusion-matrix switching mechanism (DSM) explained earlier is applied is executed, the processing sequence information storage unit has stored therein sequence information regarding the F-functions to be executed in the respective rounds. The memory address providing unit 412 acquires memory addresses of the F-function correspondence tables to be referred to in the respective rounds according to the sequence information, and provides the round function execution unit 411 with the memory addresses.

The round function execution unit 411 receives from the memory address providing unit 412 the addresses for accessing the tables corresponding to the F-functions to be executed on a round-by-round basis according to a cryptographic sequence to be executed, and executes access to the memory 420 according to the received addresses to acquire F-function correspondence tables to be applied in the respective rounds, and obtains output values (or intermediate values) corresponding to input values on the basis of reference to the tables. The round function execution unit 411 only executes the acquisition of tables to be applied in the respective rounds according to addresses modified in correspondence with the respective rounds, and is only required to successively set the addresses of the F-function correspondence tables on a round-by-round basis as arguments applied in a certain cipher function. Once the arguments are merely modified by applying one cipher function, various cryptographic processes can be executed. That is, there is no need for the process of invoking different F-functions or the like, and it is possible to quickly obtain the processing results of individual round operations (F-functions). In this configuration, furthermore, there is no need for logic circuits or the like corresponding to the respective round functions, and a reduction in the size of the apparatus and a reduction in implementation cost can be achieved.

Note that in the configuration that executes cryptographic processing to which an extended Feistel structure in which the number of data lines can be set to an arbitrary number greater than or equal to 3 is applied, which has been described earlier with reference to FIG. 6, a plurality of round functions (F-functions) may be executed in parallel in one round. In the case of a configuration that executes cryptographic processing to which an extended Feistel structure is applied, therefore, the round function execution unit 411 is preferably configured to be capable of executing a plurality of round functions (F-functions) in parallel. The round function execution unit 411 executes in parallel the processes of referring to individual F-function correspondence tables corresponding to the round functions to be executed in parallel. Note that it may be configured to sequentially perform access to the memory although the processing speed is reduced.

Note that with the use of the configuration shown in FIG. 8 in which the reference to the F-function correspondence tables stored in the memory is switched, the modification of a table to be applied in each round can be executed merely by modifying a memory-accessing address. This enables flexible modification of the table utilization sequence. For example, in cryptographic processing using the Feistel structure described earlier with reference to FIG. 5 to which the three different matrices $M_0$, $M_1$, and $M_2$ are applied, in the example shown in FIG. 5, the following setting is made:

the sequence for applying F-functions=$F_0 \to F_2 \to F_1 \to F_1 \to F_2$ . . . .

For example, this sequence is modified as follows:

$F_1$ is set at the position of $F_0$ $F_2$ is set at the position of $F_3$, and $F_0$ is set at the position of $F_2$.

Such a modification of the F-function utilization sequence can be realized merely by modifying the addresses to be applied in the respective rounds.

In the above modification example, the F-function utilization sequence for the respective rounds is set to $F_1 \to F_0 \to F_2 \to F_2 \to F_0$ . . . .

The process only required to realize such a sequence is to modify the order of addresses for invoking the F-functions to be applied in the respective rounds, and the modification can be easily done. Cryptographic processing in accordance with such a different F-function utilization sequence allows configuration of an encryption function that has inputs and outputs different from that of the F-function utilization sequence before the modification and that is equivalent in security.

Note that in the diffusion-matrix switching mechanism (DSM), security parameters vary depending on the number of different round functions (F-functions) to be applied. In general, the greater the number of different round functions (F-functions) used, the higher the security. In the case of a configuration in which a plurality of F-function correspondence tables are stored in the memory and are utilized, not all the tables to be referred to may be expected to be accommodated in a high-speed accessible memory space (for example, primary cache memory). It is therefore preferable to provide a configuration in which a memory area capable of storing the maximum number of tables that need to be referred to in accordance with the processing sequence is set as a high-speed accessible memory space.

As shown in FIG. 8, the cryptographic processing apparatus 400 of the present invention is a cryptographic processing apparatus that executes Feistel type common key block cipher processing, and includes the data processing unit 410 that selectively applies at least two or more types of different F-functions as round functions to execute round operations for a plurality of rounds, and the memory 420 having stored therein a plurality of F-function correspondence tables, each corresponding to one of the two or more types of different F-functions, in which input values and output values or intermediate values are associated with each other. The data processing unit 410 acquires, in accordance with a prescribed cryptographic processing sequence, addresses for accessing F-function correspondence tables corresponding to F-functions to be applied in the respective rounds, accesses the memory 420 by applying the acquired addresses to read the F-function correspondence tables 421 to 42$n$ corresponding to the F-functions for the respective rounds, and acquires, on the basis of reference to the tables, output values or intermediate values corresponding to input values to obtain data transformation results in accordance with the respective F-functions.

Note that the data processing unit 410 is configured to execute cryptographic processing in accordance with a Feistel structure having a diffusion-matrix switching mechanism (DSM) that selectively applies at least two or more different F-functions in which at least two or more different matrices are set as transformation matrices to be applied in linear transformation processes within the F-functions for the respective rounds. For example, the data processing unit 410 executes cryptographic processing based on a Feistel structure in accordance with the setting of the number of data lines (number of divisions) d=2 in which data to be subjected to cryptographic processing is divided into two segments, or an extended Feistel structure in which the number of data lines (number of divisions) d≧3 is set.

The data processing unit 410 executes a preset cipher function, appropriately switches, on occasion of the execution of the cipher function, on a round-by-round basis, addresses for accessing F-function correspondence tables corresponding to F-functions to be applied in the respective rounds to read the F-function correspondence tables corresponding to the F-functions for the respective rounds from the memory 420, and acquires, on the basis of reference to the tables, output values or intermediate values for input values to obtain data transformation results in accordance with the respective F-functions.

Note that the F-function correspondence tables 421 to 42$n$ stored in the memory 420 are F-function correspondence tables in which input values for the respective F-functions or data constituting the input values, and output values or intermediate values of the F-functions or data constituting them are associated with each other.

As described previously, with such a configuration, the data processing unit 410 can execute data transformation processes in accordance with the F-functions for the respective rounds by acquiring tables according to addresses modified in correspondence with the respective rounds. It is only required to successively set the addresses of the F-function correspondence tables on a round-by-round basis as arguments applied in a certain cipher function. Once the arguments are merely modified by applying one cipher function, various cryptographic processes can be executed. That is, there is no need for the process of invoking different F-functions or the like, and it is possible to quickly obtain the processing results of individual round operations (F-functions). In this configuration, furthermore, there is no need for logic circuits or the like corresponding to the respective round functions, and a reduction in the size of the apparatus and a reduction in implementation cost can be achieved.

[5. Example Configuration of Cryptographic Processing Apparatus]

Finally, FIG. 10 shows an example configuration of an IC module 700 serving as a cryptographic processing apparatus that executes the cryptographic processing according to the exemplary embodiment described above. The processing described above can be executed in, for example, PCs, IC cards, readers/writers, or various other information processing apparatuses. The IC module 700 shown in FIG. 10 can be configured within such various devices.

A CPU (Central processing Unit) 701 shown in FIG. 10 is a processor that executes control of start or end of cryptographic processing and transmission and reception of data, and control of data transfer between constituent units, and various other programs. A memory 702 includes a ROM (Read-Only-Memory) that stores a program executed by the CPU 701 or fixed data such as operation parameters, a RAM (Random Access Memory) used as a storage area or work area for a program executed in the processing of the CPU 701 and parameters that appropriately change in the program processing, and so forth. The memory 702 is also used as a storage area for key data necessary for cryptographic processing, a transformation table (permutation table) applied in cryptographic processing, data applied to transformation matrices, etc. As described with reference to FIGS. 8 and 9, the memory 702 is further used as a storage area for the F-function correspondence tables described above for obtaining output values corresponding to different F-functions.

As described above, tables corresponding to round functions (F-functions) $F_0, F_1 \ldots$ to which different linear transformation matrices $M_0, M_1, \ldots$ are applied, that is, a plurality of F-function correspondence tables in which values necessary for calculating output values based on input values of the different F-functions $F_0, F_1 \ldots$ are stored in association with the respective input values, are held. Note that the data storage area is preferably configured as a memory having a tamper-resistant structure.

A cryptographic processing unit 703 executes cryptographic processing and decryption processing according to a common key block cipher processing algorithm in accordance with, for example, the Feistel structure or extended Feistel structure described above. Note that, here, cryptographic processing means is shown as a separate module by way of example. However, it may be configured such that instead of providing such an independent cryptographic processing module, for example, a cryptographic processing program is stored in the ROM so that the CPU 701 reads and executes the program stored in the ROM.

A random number generator 704 executes a process of generating random numbers necessary for the generation of keys necessary for cryptographic processing or the like.

A transmitting/receiving unit 705 is a data communication processing unit that executes data communication with outside. For example, the transmitting/receiving unit 705 executes data communication with an IC module such as a reader/writer, and executes the output of ciphertext generated in the IC module, the input of data from an external device such as a reader/writer, etc.

The cryptographic processing unit 703 of the IC module 700 executes, for example, Feistel type cryptographic processing with the number of data lines d=2 or extended Feistel type cryptographic processing in which the number of data lines d is an integer satisfying $d \geq 3$. Alternatively, the cryptographic processing unit 703 executes cryptographic processing in accordance with a Feistel structure having a diffusion-matrix switching mechanism (DSM) that selectively applies at least two or more different F-functions in which at least two or more different matrices are set. Note that, on occasion of cryptographic processing, as explained with reference to FIGS. 8 and 9, addresses for acquiring F-function correspondence tables for obtaining output values corresponding to different F-functions are successively switched in the respective rounds to execute access to the memory to acquire output values or intermediate values corresponding to input values of the respective F-functions to execute round operations. With this processing, processes in accordance with various cryptographic sequences can be performed by utilizing one cipher function in which memory-accessing addresses are set as arguments without utilizing various cipher functions.

The present invention has been described in detail with reference to a specific exemplary embodiment. However, it is obvious that a person skilled in the art could make modifications or alternatives to the exemplary embodiment without departing from the scope of the present invention. That is, the present invention has been disclosed in a form of illustration, and should not be restrictively construed. References should be made to the section of CLAIMS for determining the scope of the present invention.

The series of processes explained herein can be executed by hardware or software, or a combination configuration of both. In a case where the processes are executed by software, a program recording the processing sequence can be installed into a memory in a computer incorporated in dedicated hardware and executed. Alternatively, the program can be installed into a general-purpose computer capable of executing various processes and executed.

For example, the program can be recorded in advance on a hard disk or ROM (Read Only Memory) serving as a recording medium. Alternatively, the program can be stored (recorded) temporarily or permanently on a removable recording medium such as a flexible disc, a CD-ROM (Compact Disc Read Only Memory), an MO (Magneto optical) disc, a DVD (Digital Versatile Disc), a magnetic disc, or a semiconductor memory. Such removable recording media can be provided as so-called packaged software.

Note that the program can be installed from a removable recording medium as described above into a computer and can also be transferred wirelessly from a download site to a computer, or transferred by wire to a computer via a network such as a LAN (Local Area Network) or the Internet, and the computer can receive the program transferred in such a manner and install it into a built-in recording medium such as a hard disk.

Note that various processes described herein may be executed sequentially in the order described, or may also be executed in parallel or individually, according to the processing capabilities of an apparatus that executes the processes or necessity. In addition, as used in the description the term system refers to a configuration of a logical set of a plurality of apparatuses, and is not limited to one whose constituent apparatuses are housed in a single housing.

INDUSTRIAL APPLICABILITY

As described above, according to a configuration of an exemplary embodiment of the present invention, in a configuration that executes cryptographic processing by performing round operations to which at least two or more types of different F-functions are selectively applied as round functions, a plurality of F-function correspondence tables, each corresponding to one of the F-functions, in which input values and output values or intermediate values are associated with each other are stored in a memory; in accordance with a prescribed cryptographic processing sequence, table-accessing addresses corresponding to F-functions for the respective rounds are applied to read F-function correspondence tables from the memory; and output values or intermediate values for input values are acquired on the basis of reference to the tables to obtain data transformation results in accordance with the respective F-functions. According to the present configuration, respective F-function correspondence tables are acquired according to addresses modified in correspondence with the respective rounds to enable efficient acquisition or calculation of output values corresponding to input values. Various cryptographic processes can be executed merely by, for example, applying one cipher function to modify arguments.

The invention claimed is:

1. A cryptographic processing apparatus that executes Feistel type common key block cipher processing, the apparatus comprising:
 a data processing unit that executes round operations for a plurality of rounds by selectively applying at least two or more types of different F-functions as round functions; and
 a memory having stored therein a plurality of F-function correspondence tables, each corresponding to one of the at least two or more types of different F-functions, in which input values and output values are associated with each other,
 wherein the data processing unit is configured to:
 in accordance with a prescribed cryptographic processing sequence, acquire addresses for accessing F-function correspondence tables corresponding to F-functions to be applied in respective rounds, access the memory by applying the acquired addresses to read the F-function correspondence tables corresponding to the F-functions for the respective rounds, and acquire, on the basis of reference to the tables, output values for input values to obtain data transformation results in accordance with the respective F-functions, and
 execute cryptographic processing in accordance with a Feistel structure or extended Feistel structure having a diffusion-matrix switching mechanism that selectively applies at least two or more different F-functions in which at least two or more different matrices are set as transformation matrices to be applied to linear transformation processes within the F-functions for the respective rounds.

2. The cryptographic processing apparatus according to claim 1, wherein the data processing unit is configured to execute cryptographic processing based on a Feistel structure that executes cryptographic processing according to a setting of the number of data such that data to be subjected to the cryptographic processing is divided into two segments.

3. The cryptographic processing apparatus according to claim 1, wherein the data processing unit is configured to execute cryptographic processing based on an extended Feistel structure that executes cryptographic processing according to a setting of the number of data lines such that data to be subjected to cryptographic processing is divided into three or more segments.

4. The cryptographic processing apparatus according to claim 1, wherein the data processing unit is configured to execute a preset cipher function, appropriately switch, on occasion of the execution of the cipher function, on a round-by-round basis, addresses for accessing F-function correspondence tables corresponding to F-functions to be applied in respective rounds to read the F-function correspondence tables corresponding to the F-functions for the respective rounds, and acquire, on the basis of reference to the tables, output values for input values to obtain data transformation results in accordance with the respective F-functions.

5. The cryptographic processing apparatus according to claim 1, wherein the memory is configured to store F-function correspondence tables in which input values for the respective F-functions or data constituting the input values, and output of the F-functions or data constituting the output values are associated with each other.

6. A cryptographic processing method that executes Feistel type common key block cipher processing in an encryption processing apparatus, the method comprising:
 executing round operations for a plurality of rounds by selectively applying at least two or more types of different F-functions as round functions,
 the executing round operations including:
 acquiring addresses for accessing F-function correspondence tables corresponding to F-functions to be applied in respective rounds,
 executing memory access by applying the acquired addresses to read the F-function correspondence tables corresponding to the F-functions for the respective rounds from a memory having stored therein a plurality of F-function correspondence tables, each corresponding to one of the at least two or more types of different F-functions, in which input values and output values are associated with each other,
 acquiring, from the tables, output values for F-function input values to obtain data transformation results in accordance with the respective F-functions, and
 executing cryptographic processing in accordance with a Feistel structure or extended Feistel structure having a diffusion-matrix switching mechanism that selectively applies at least two or more different F-functions in which at least two or more different matrices are set as transformation matrices to be applied to linear transformation processes within the F-functions for the respective rounds.

7. A non-transitory computer-readable storage medium including instructions that, when executed by a processor, perform a method that executes Feistel type common key block cipher processing in a cryptographic processing apparatus, the method comprising:
 executing round operations for a plurality of rounds by selectively applying at least two or more types of different F-functions as round functions,
 the executing round operations including:
 acquiring addresses for accessing F-function correspondence tables corresponding to F-functions to be applied in respective rounds,
 executing memory access by applying the acquired addresses to read the F-function correspondence tables corresponding to the F-functions for the respective rounds from a memory having stored therein a plurality of F-function correspondence tables, each corresponding to one of the at least two or more types of different F-functions, in which input values and output values are associated with each other,
 acquiring, from the output values for F-function input values to obtain data transformation results in accordance with the respective F-functions, and executing cryptographic processing in accordance with a Feistel structure or extended Feistel structure having a diffusion-matrix switching mechanism that selectively applies at least two or more different F-functions in which at least two or more different matrices are set as transformation matrices to be applied to linear transformation processes within the F-functions for the respective rounds.

8. A cryptographic decryption apparatus that executes Feistel type common key block cipher decryption, the apparatus comprising:
   a data decrypting unit that executes round operations for a plurality of rounds by selectively applying at least two or more types of different F-functions as round functions; and
   a memory having stored therein a plurality of F-function correspondence tables, each corresponding to one of the at least two or more types of different F-functions, in which input values and output values are associated with each other,
   wherein the data decryption unit is configured to:
   in accordance with a prescribed cryptographic processing sequence, acquire addresses for accessing F-function correspondence tables corresponding to F-functions to be applied in respective rounds, access the memory by applying the acquired addresses to read the F-function correspondence tables corresponding to the F-functions for the respective rounds, and acquire, on the basis of reference to the tables, output values for input values to obtain data transformation results in accordance with the respective F-functions, and
   execute cryptographic decryption in accordance with a Feistel structure or extended Feistel structure having a diffusion-matrix switching mechanism that selectively applies at least two or more different F-functions in which at least two or more different matrices are set as transformation matrices to be applied to linear transformation processes within the F-functions for the respective rounds.

9. A cryptographic decryption method that executes Feistel type common key block cipher decrypting in decrypting apparatus, the method comprising:
   executing round operations for a plurality of rounds by selectively applying at least two or more types of different F-functions as round functions,
   the executing round operations including:
   acquiring addresses for accessing F-function correspondence tables corresponding to F-functions to be applied in respective rounds,
   executing memory access by applying the acquired addresses to read the F-function correspondence tables corresponding to the F-functions for the respective rounds from a memory having stored therein a plurality of F-function correspondence tables, each corresponding to one of the at least two or more types of different F-functions, in which input values and output values are associated with each other,
   acquiring, from the tables, output values for F-function input values to obtain data transformation results in accordance with the respective F-functions, and
   execute cryptographic decryption in accordance with a Feistel structure or extended Feistel structure having a diffusion-matrix switching mechanism that selectively applies at least two or more different F-functions in which at least two or more different matrices are set as transformation matrices to be applied to linear transformation processes within the F-functions for the respective rounds.

10. A non-transitory computer-readable storage medium including instructions that, when executed by a processor, perform a method that executes Feistel type common key block cipher decryption in a cryptographic decryption apparatus, the method comprising:
   executing round operations for a plurality of rounds by selectively applying at least two or more types of different F-functions as round functions,
   the executing round operations including:
   acquiring addresses for accessing F-function correspondence tables corresponding to F-functions to be applied in respective rounds,
   executing memory access by applying the acquired addresses to read the F-function correspondence tables corresponding to the F-functions for the respective rounds from a memory having stored therein a plurality of F-function correspondence tables, each corresponding to one of the at least two or more types of different F-functions, in which input values and output values are associated with each other,
   acquiring, from the output values for F-function input values to obtain data transformation results in accordance with the respective F-functions and
   executing cryptographic decryption in accordance with a Feistel structure or extended Feistel structure having a diffusion-matrix switching mechanism that selectively applies at least two or more different F-functions in which at least two or more different matrices are set as transformation matrices to be applied to linear transformation processes within the F-functions for the respective rounds.

* * * * *